Dec. 20, 1955
D. SCIAKY
2,728,046
COMBINATION SINGLE-PHASE LINE FREQUENCY
WELDER AND IMPULSE WELDER
Filed Jan. 22, 1953
4 Sheets-Sheet 1
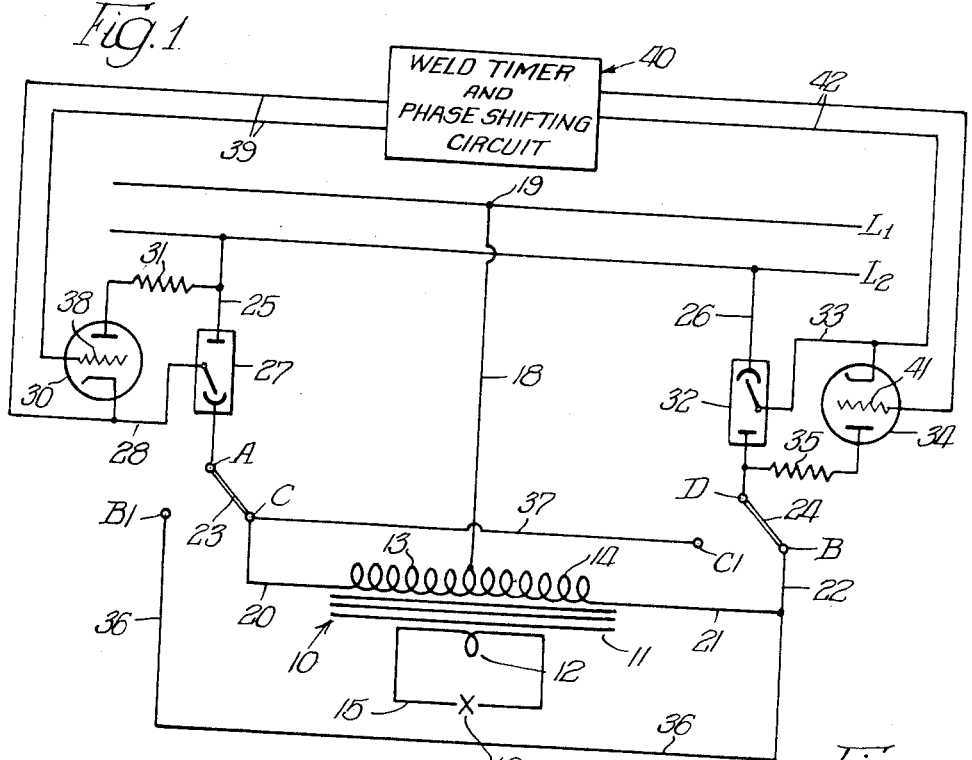
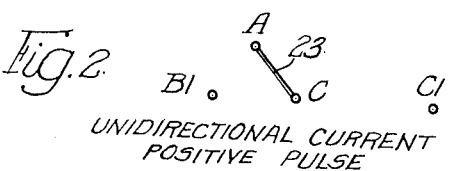
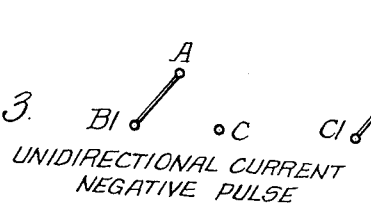
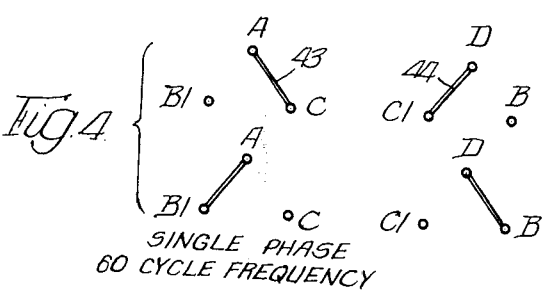
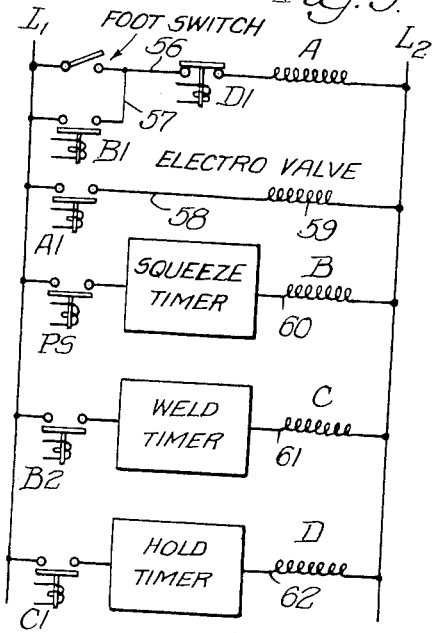
INVENTOR.
David Sciaky,
BY
Wilkinson Huxley Byron & Hume
ATTYS.

Dec. 20, 1955
D. SCIAKY
2,728,046
COMBINATION SINGLE-PHASE LINE FREQUENCY
WELDER AND IMPULSE WELDER
Filed Jan. 22, 1953
4 Sheets-Sheet 2
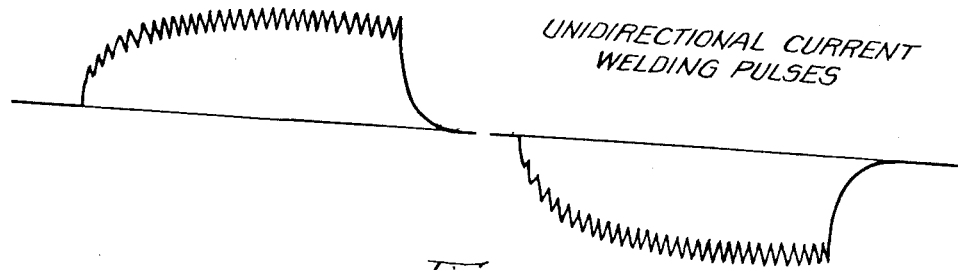
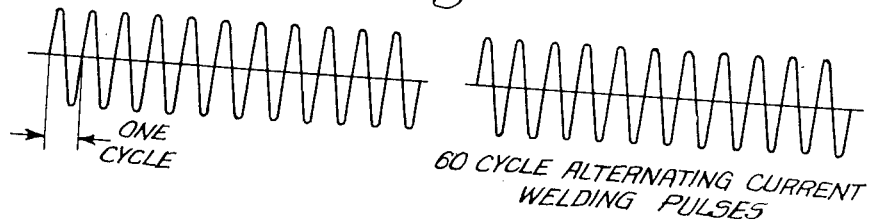
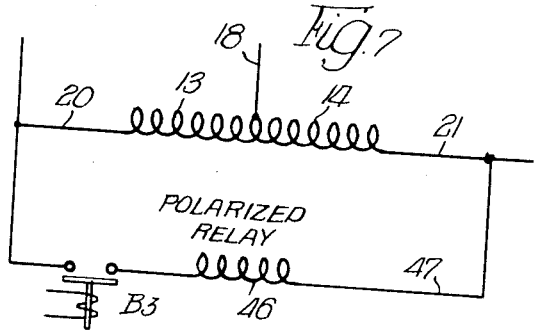
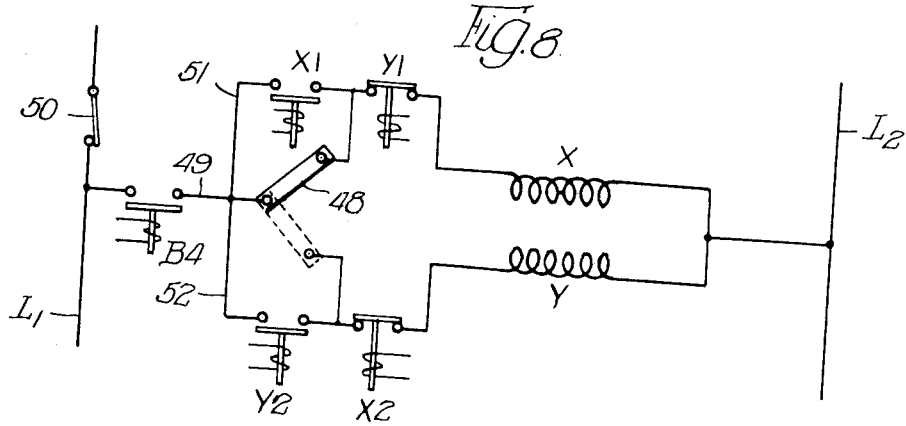
INVENTOR.
David Sciaky,
BY INVENTOR.
David Sciaky, Dec. 20, 1955
D. SCIAKY
2,728,046
COMBINATION SINGLE-PHASE LINE FREQUENCY
WELDER AND IMPULSE WELDER
Filed Jan. 22, 1953
4 Sheets-Sheet 4
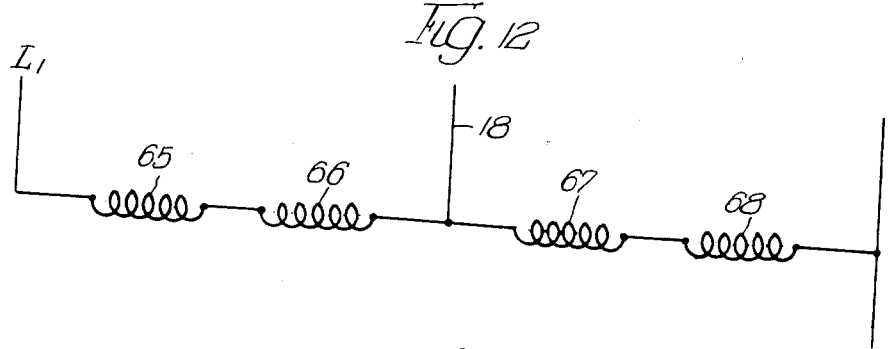
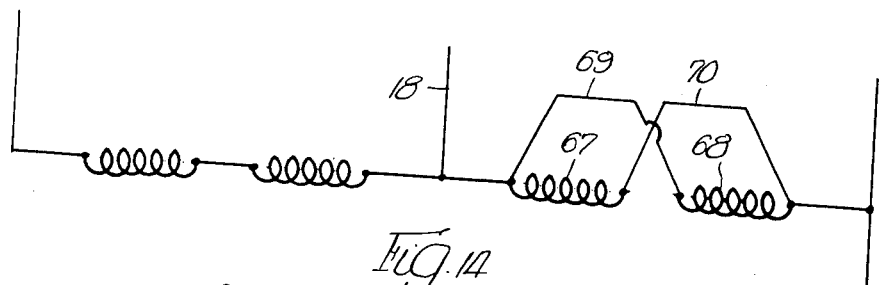
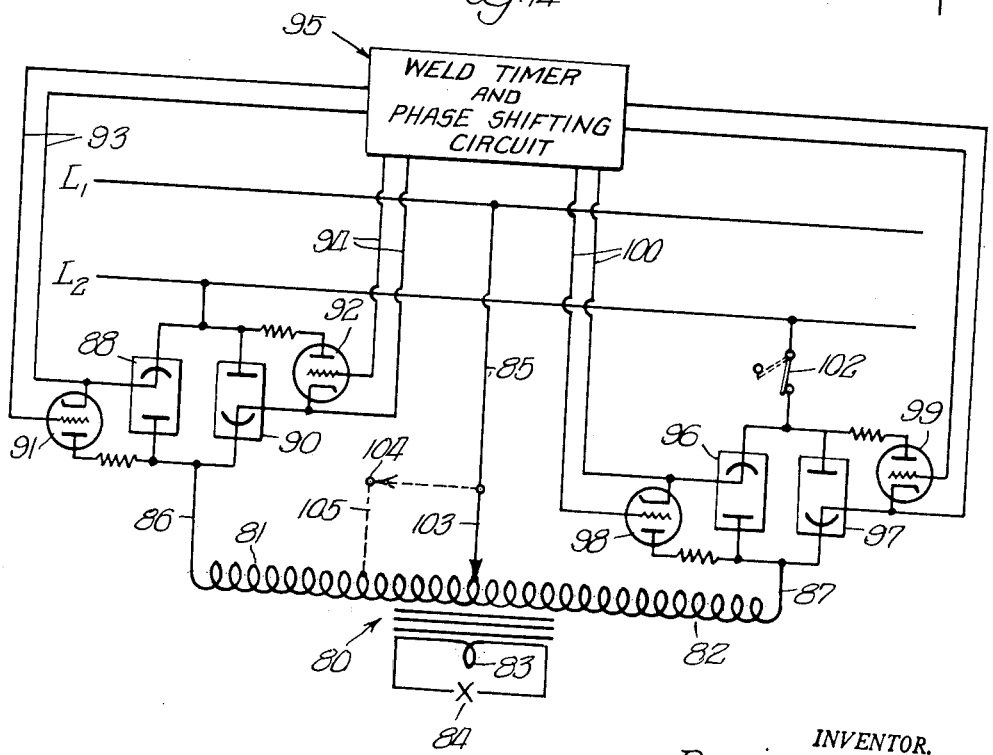
INVENTOR.
David Sciaky,
BY
Wilkinson Huxley Byron & Hume
Attys.

United States Patent Office 2,728,046
Patented Dec. 20, 1955

2,728,046
COMBINATION SINGLE-PHASE LINE FREQUENCY WELDER AND IMPULSE WELDER

David Sciaky, Chicago, Ill., assignor to Welding Research, Inc., Chicago, Ill., a corporation of Illinois Application January 22, 1953, Serial No. 332,714

14 Claims. (Cl. 323—58)

The invention relates to welding systems for the resistance welding of metals and has reference in particular to a novel system which will supply several types of welding pulses in the secondary or load circuit whereby to provide a versatile welder having utility for many different welding applications.

For the welding of certain metals the conventional type of alternating current welder is entirely satisfactory. During operation of these A. C. welders, as they are generally termed, a conventional sixty-cycle alternating current is passed through the work and current flow is maintained for a selected number of cycles, as determined by the timer of the welder. Welding devices of this type employ electric discharge valves connected inversely or in back to back relation and the conductivity of the discharge valve is controlled by the timer through firing valves having electrical connection with the discharge valves.

The conventional A. C. welders have a number of operating disadvantages due largely to the high frequency of the current caused to flow in the welding circuit. The above disadvantages are eliminated by the single phase low frequency converters which produce in the welding circuit three types of power output, namely, a single unidirectional current pulse of relatively long duration, a series of such uni-directional current pulses of the same polarity, or a series of such current pulses, each being opposite in polarity to the one immediately preceding it and so comprising a form of low frequency alternating current. In such a system the magnitude of the secondary current pulses and the duration of each pulse can be controlled by the voltage of the power supply and by its time of application across the primary windings.

A general object of the invention is to provide a combination welder which will include a relatively simple electrical circuit and which will operate as a conventional sixty-cycle welder or as an impulse welder, the circuit in the former case producing pulses of sixty cycle alternating current for welding, and in the latter case producing pulses of unidirectional current such as many comprise any one of the three types of power output above described.

A more particular object is to provide a combination welder which will operate as a conventional sixty-cycle welder or an impulse welder employing the uni-directional current impulses for welding, and wherein said combination welder will incorporate switch means adapted to be manually actuated for switching from one mode of operation to the other.

A further object is to provide a combination welder of the character described wherein mechanical contactors are employed for reversing current flow when the machine is operated as an impulse welder, the said contactors being actuated automatically by relay means responsive to current flow in the windings of the welding transformer.

Another and more specific object is to provide a combination welder as described which will incorporate a welding system employing two electric discharge valves of the asymmetrically conducting type with timing means therefor, and wherein said discharge valves will rectify the alternating supply current during operation of the system as an impulse welder, and which will act as electronic contactors during conventional sixty-cycle operation.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is a schematic wiring diagram of a welding system incorporating the combination features of the present invention;

Figures 2, 3 and 4 are schematic views illustrating positions of the contactors for producing respectively a positive pulse of uni-directional current, a negative pulse of such current, and a current of conventional sixty-cycle frequency;

Figure 10:
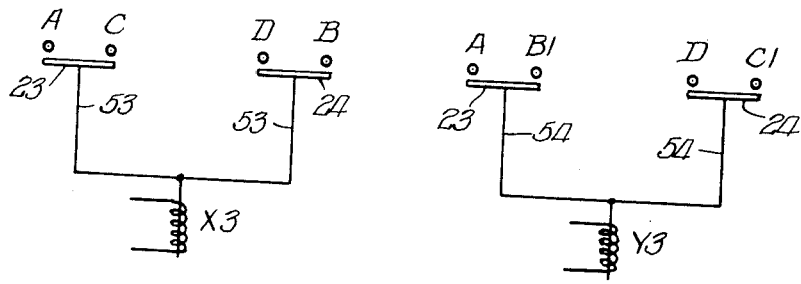
Figure 11:
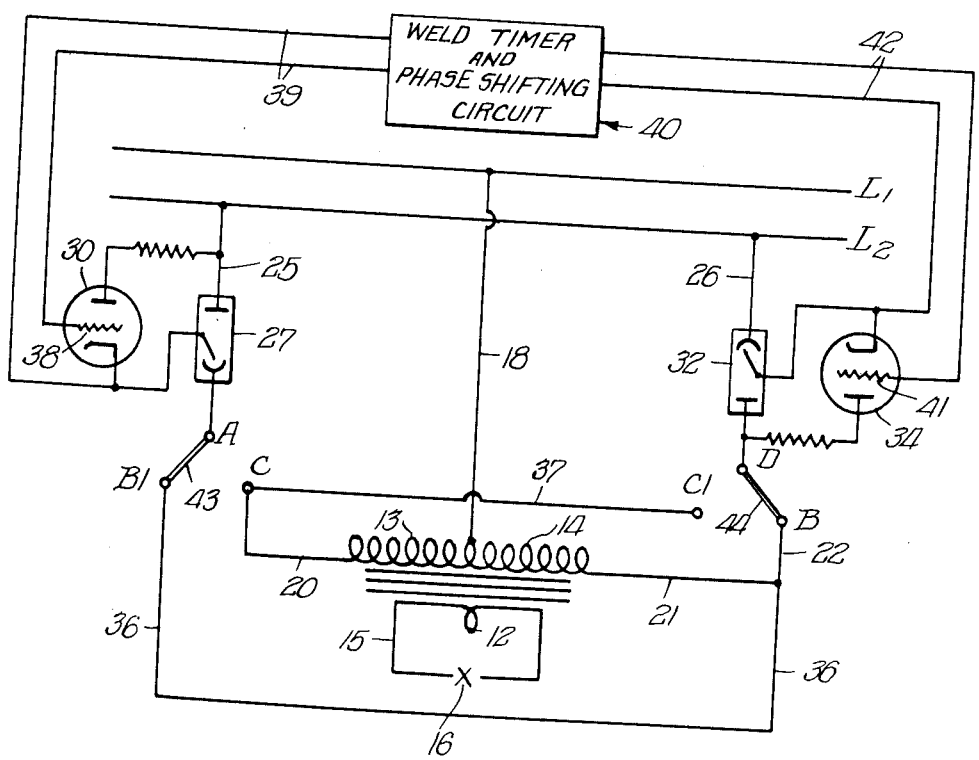

Figure 5 graphically illustrates a positive and a negative pulse of uni-directional current as produced in the load circuit of the welder when operating as an impulse welder;

Figure 6 graphically illustrates timed pulses of conventional sixty-cycle current which the present welder is also capable of delivering;

Figure 7 is a fragmentary schematic wiring diagram illustrating certain circuit elements incorporated in the present combination welder;

Figure 8 is a wiring diagram illustrating schematically the relay mechanism for automatically actuating the contactors to effect reversals in the welding current on successive pulses;

Figure 9 is a schematic wiring diagram showing the circuit connections for controlling and timing a welding operation such as may be produced by the present combination welder;

Figure 10 is a view showing the relays for actuating the two groups of contactors having positions as illustrated in Figures 2 and 3;

Figure 11 is a schematic wiring diagram similar to that of Figure 1 but showing the manually actuated switch means in position for conventional sixty-cycle welding;

Figure 12 is a schematic wiring diagram of the primary winding of the welding transformer showing the same including four coils in series relation;

Figure 13 is a schematic wiring diagram similar to Figure 12 but illustrating a parallel circuit connection for the two coils in a half section of the primary; and Figure 14 is a wiring diagram illustrating schematically a modified form of combination welder coming within the invention.

Referring to the form of the invention shown in Figure 1 of the drawings, the numeral 10 indicates a welding transformer including an iron core 11, secondary windings 12, and primary windings 13 and 14. The secondary windings 12 are connected by means of conductor 15 to the work circuit or secondary circuit of the welding transformer and which may include the work pieces to be welded and indicated by numeral 16. The primary windings 13 and 14 are essentially one winding and they comprise the primary load circuit of the transformer although, as illustrated in Figure 1, it is convenient to center tap the primary load circuit so that windings 13 are located to one side, whereas windings 14 are disposed on the opposite side. The center tapping of the primary load circuit is effected by the conductor 18 which electrically connects with one terminal of the single phase alternating current source indicated by lines L₁ and L₂. Said source supplies the conventional sixty-cycle alternating current and since all industrial plants are provided with such alternating current the terminals of such a source are frequently referred to as a first and second bus. Accordingly, it will be seen that conductor 18 is connected at 19 to the first bus.

The primary winding 13 is connected by conductor 20 to terminal C. In a similar manner primary winding 14 is connected by conductors 21 and 22 to terminal B. A mechanical contactor 23 electrically connects terminal C with terminal A and a similar mechanical contactor 24 connects terminal B to terminal D. In accordance with the invention terminals A and D are each connected to the second bus of the alternating current supply source by means of their respective conductors 25 and 26. An electric discharge valve is interposed in each of the conductors 25 and 26, the said valve being of the asymmetrically conducting type, and including an anode, a cathode and an igniter. The electric discharge valve 27 is interposed in the conductor 25 and the igniter of said valve is connected by conductor 28 to the cathode of a firing valve such as 30. The anode of said firing valve is connected through the current limiting resistor 31 to conductor 25. The electric discharge valve 32 is connected to conductor 26 and the igniter of said valve is joined by conductor 33 to the cathode of the firing valve 34. The anode of said firing valve is connected through current limiting resistor 35 to conductor 26. It will be observed that the electric discharge valves 27 and 32 are inversely connected to the alternating current source, since conductor 25 connects the anode of valve 27 to the second bus, whereas, conductor 26 connects the cathode of valve 32 to the second bus.

A third terminal is provided with respect to terminals A and C and this third terminal is indicated by B1 since the same is electrically connected through conductors 36 and 22 to the terminal B, previously referred to, and having association with terminal D. The said pair of terminals D and B also have a third terminal associated therewith, namely, C1, which is connected by means of conductor 37 to terminal C. Each of the contactors 23 and 24 may accordingly have two positions, one of which is illustrated in Figure 2, wherein the contactor 23 connects terminals A and C with contactor 24 connecting terminals D and B. The second position of the contactors is shown in Figure 3, wherein contactor 23 connects terminals A and B1 with contactor 24 connecting D and C1. The welding system will produce a positive pulse of uni-directional current in the secondary load circuit 15 when the mechanical connectors are positioned as shown in Figure 2, and a negative pulse of uni-directional current is produced in the secondary load circuit 15 when the mechanical contactors are positioned as shown in Figure 3. Each pulse of uni-directional current, whether positive or negative, will perform a welding operation and for timing the pulse the grids of the firing valves 30 and 34 are connected to a weld timer. For example, the grid and cathode of firing valve 30 are connected by means of the conductors 39 to the weld timer, indicated by numeral 40. In a similar manner the grid and cathode of the firing valve 34 are connected by means of conductors 42 to said weld timer 40.

Before describing the mode of operation of the present welding system for producing the positive and negative pulses of uni-directional current, it is desirable to point out that the welding system will also produce timed pulses of sixty-cycle alternating current and thus operate as a conventional welder. For this purpose it is necessary to change the position of the mechanical contactors 23 and 24. It may be preferable to provide additional switching means such as the contactors 43 and 44 and said switching means may be positioned as shown in Figure 4, in order to cause the welder to operate as a sixty-cycle welder. Such mode of operation can be achieved with contactor 43 connecting terminals A and C while at the same time contactor 44 connects terminals D and C1. A second possible position of the switching means is also shown in Figure 4 for operation as a conventional sixty-cycle welder, wherein contactor 43 connects terminals A and B1 with contactor 44 connecting terminals D and B. The timer has operation in a manner as previously explained to control the duration of the welding pulse by controlling the grid bias applied to the grids of the firing valves. Accordingly, with the system operating as a converter to produce a pulse of uni-directional current, the duration of each pulse is either positive or negative, timed by the weld timer 40 so that the pulses may have the shape and characteristics as shown in Figure 5. With the system operating as a conventional welder the timing of the alternating current is such as to produce welding pulses such as shown in Figure 6.

With the contactors 23 and 24 positioned as shown in Figure 1 the welding system operates as a full wave rectifier of the single phase alternating current. When $L_1$ of the alternating current source is positive the said positive half cycle will flow through conductor 18, through primary winding 14, through contactor 24, returning through valve 32 to line $L_2$. When $L_2$ is positive the pulse will flow through valve 27, through contactor 23, primary winding 13, and through conductor 18 to return to the source. Accordingly, both the positive half cycle and the negative half cycle of the alternating current are caused to flow through the primary windings in a direction from left to right. The first pulse in flowing through winding 14 will generate a magnetic flux in the transformer and this flux is increased in magnitude by the action of the next pulse of current in flowing through winding 13. The succeeding current pulses which will flow through the windings in the same direction will have the effect of building up this magnetic flux with the result that a steady rise in the flux takes place, inducing a pulse of uni-directional current in the secondary winding, which may flow through the secondary load circuit to effect a welding of the workpieces 16. The duration of the welding pulse is controlled by the weld timer such as 40, which may also incorporate a phase shifting circuit in order to control the magnitude of the secondary pulse and thus its heating effect. The electric discharge valves 27 and 32 are rendered conductive by the firing valves 30 and 34 which are fired when the bias voltage on the grids 38 and 41 are changed from a negative hold-off bias to a positive potential. Each half cycle of current caused to flow through windings 13 and 14 produces a rise in the magnetic flux as described which results in the pips or ripple in the induced uni-directional current pulse, all as clearly shown in Figure 5. In order to terminate the welding operation the negative hold-off bias is applied again to grids 32 and 41, rendering the electric discharge valves 27 and 32 non-conductive, and the completed uni-directional welding pulse will have the shape and characteristics as shown in said figure, wherein the current rises gradually to a peak maximum and then decays abruptly to zero. As shown in Figure 5 the uni-directional current pulse consists of twenty pips so that the duration of the pulse may be said to consist of ten cycles of alternating current.

For the next welding operation the contactors 23 and 24 are switched to the position shown in Figure 3. Whereas valve 27 was previously connected to terminal winding 13 and valve 32 was connected to the terminal of winding 14, the connections are now reversed with valve 27 being connected to the terminal of winding 14, and valve 32 being connected to the terminal of winding 13. For this second welding operation the welding system operates in a manner as above described to perform a full wave rectification of the single phase alternating current source by causing the positive and negative half cycles to flow through the primary windings in the same direction, in this case from right to left. For example, when line $L_1$ is positive the current pulse will flow through conductor 18, through winding 13, from right to left, through conductor 37 and valve 32 to thus return to line L2. When said line L2 is positive the pulse will flow through valve 27, conductor 36, conductor 21, through winding 14, from right to left, returning by way of conductor 18. Each pulse of current in flowing through the primary windings in the same direction as described has the effect of building up the magnetic flux, producing a steady rise in the flux to thereby induce a pulse of unidirectional current in the secondary winding. However, this pulse is in a direction opposite to that described when the contactors were positioned as shown in Figure 2, and since the first pulse was defined as positive, this second pulse of uni-directional current is accordingly negative. For each succeeding welding operation the contactors are switched, first assuming the position as shown in Figure 2, then the position as shown in Figure 3, and so on. By reversing the current flow through the welding transformer for each welding pulse, saturation of the transformer is prevented and a higher efficiency as regards the induced secondary current is obtained.

In accordance with the invention the switching of the contactors 23 and 24 is effected in an automatic manner, being controlled by current flow through the primary windings of the transformer. Referring particularly to Figure 7 of the drawings, it will be seen that a polarized relay having a winding identified by numeral 46, is connected across primary windings 13 and 14 by conductor 47. A contactor B3 is interposed in conductor 47 and a contactor B4 is interposed in conductor 49, Figure 8. In accordance with the sequencing mechanism of the welder to be presently described, the contactors B3 and B4 close at the end of the squeeze period. The polarized relay includes an armature 48 which is actuated as a result of current flow taking place through its inductive winding 46, and for each energization of said winding 46 the armature 48 thereof reverses its position. Armature 48 is included in an electrical circuit formed by conductor 49 having connection with line L1. The switch 50 is located in line L1 so that the action of armature 48 of the polarized relay can be rendered operative or inoperative for switching contacts 23 and 24. When contactor B4 is closed the circuit including armature 48 is closed through either relay winding X or Y, to the opposite terminal L2 of the alternating current source. Conductor 49 is connected to relay winding X by means of a by-pass circuit 51, which circuit includes a normally open contactor X1. The normally closed contactor Y1 is in series with the relay winding X. In a similar manner the conductor 49 is connected by means of the by-pass circuit 52 with relay winding Y, the said by-pass circuit including the normally open contactor Y2. The normally closed contactor X2 is in series with the winding Y.

The relay windings X and Y are also operative to cause actuation of contactors X3 and Y3, respectively, as shown in Figure 10. These contactors are provided with bifurcated arms or supports such as 53 for contactor X3, and 54 for contactor Y3. The contactors 23 and 24 are secured to supports 53 in such position as to close terminals AC and DB upon energization of relay coil X, and thus when contactor X3 is operative, it will be seen that the welding system will operate to produce a positive pulse of uni-directional current. The contactors 23 and 24 are duplicated and fixed to supports 54 provided by contactor Y3, and in this instance the contactors 23 and 24 are so positioned as to close terminals AB1 and DC1 when operative, due to energization of relay winding Y. Thus when contactor Y3 is operative it will be seen that the contactors 23 and 24 are positioned according to Figure 3 to result in a negative pulse of uni-directional current.

In order to describe the manner in which contactors X3 and Y3 are alternately rendered operative, it will be assumed that armature 48 of the polarized relay was left in full line position, Figure 8, as a result of the last energization of winding 46. At the start of the next weld time, contactors B3 and B4 will be closed and upon current flow taking place in either winding 13 or 14, similar current flow will take place through winding 46. With contactor B4 closed the relay winding X is energized through armature 48. Winding X being energized the contactor X1 will close and contactor X2 will open. Also contactor X3 will be closed, thus connecting terminals AC and DB of the welding system. The polarized relay has such a mode of operation that armature 48 is reversed in position for each energization of winding 46. Thus the armature 48 will move from its full line position to the dotted line position as shown in Figure 8. Relay winding X is still maintained energized through by-pass circuit 51, but relay winding Y is not energized since contactor X2 is open. Upon completion of the welding operation the contactors B3 and B4 are caused to open and accordingly the relay winding X becomes deenergized, allowing contactors X1 and X2 to return to normal position and effecting actuation of X3 to open the contactors 23 and 24. The terminals AC and DB are thus disconnected.

For the next welding operation the same sequence of events takes place although this time the relay winding Y is energized to effect operation of its several contactors. At the start of a weld period contactor B3 and contactor B4 will be closed. Relay winding Y is energized as a result of the dotted line position now assumed by armature 48. Accordingly, contactor Y1 opens, contactor Y2 closes, and contactor Y3 is rendered operative to connect terminals AB1 and DC1 of the welding system. Here again the actuation of the polarized relay is to reverse armature 48 so that the armature again assumes its full line position. However, relay winding Y is maintained energized through its by-pass circuit since both contactors X2 and Y2 are closed. All the contactors maintain their position as described until the welding operation is terminated, whereupon the contactors return to normal position and the terminals AB1 and DC1 are disconnected.

Accordingly, the relay structure of Figures 7, 8 and 9 has automatic operation to switch the contactors 23 and 24 so that they alternately assume the positions shown in Figures 2 and 3. For each welding operation the pulse of uni-directional current induced in the secondary is accordingly reversed in polarity.

In order for the welding system to operate as a conventional sixty-cycle welder it is necessary to effect a different connection of the terminals, such connections being shown in Figure 4. The invention contemplates that the operator will manually connect the proper terminals for a conventional welding operation. It is preferred to employ different switching instrumentalities such as the members 43 and 44 shown in Figures 4 and 11. When the members, respectively, connect terminals AC and DC1 the welding system, insofar as primary winding 13 is concerned, will operate as a conventional welder with alternating current from the source flowing through said winding 13 at the same frequency as the source. For example, when L1 is positive the pulse will flow through conductor 18, through winding 13, from right to left, through conductor 37, through valve 32, returning to the source. When L2 is positive the pulse will flow through valve 27, through winding 13, from left to right, returning by way of conductor 18. The operation will continue for the period as determined by the timer so that an impulse of alternating current of sixty-cycle frequency is induced in the secondary as shown in Figure 6. When terminals AB1 and DB it will be seen that a somewhat similar operation of the welding system takes place. However, the alternating current this time will flow through winding 14. For example, when L1 is positive the pulse will flow through conductor 18 through winding 14, from left to right, through valve 32, returning to the source. When $L_2$ is positive the pulse flows through valve 27, through conductors 36 and 21, through winding 14 from right to left, returning by way of conductor 18. The second welding pulse of alternating current is similar to the first welding pulse and may have the same duration, depending on the setting of the weld timer. Since only a half section of the primary winding was employed for each operation of the system as a conventional welder, it is necessary for the welding transformer of the same to be somewhat larger in capacity than normally required for a single phase sixty-cycle machine.

Figure 9 illustrates schematically an electric circuit for controlling the various operations for welding, beginning with the actuation of the foot switch by the operator to the end of the "Hold" time period. Referring to said figure, the conductors $L_1$ and $L_2$ represent a source of alternating current and the several timing devices are connected across the terminals of said source in parallel relation with each other. The conductor 56 is provided with a foot switch, with the contactor D1, and with the relay winding A. The by-pass circuit formed by conductor 57 by-passes the foot switch and has the contactor B1 interposed therein. When the operator closes the foot switch it will be seen that the relay winding A will be energized since contactor D1 is normally closed. The relay winding A has a contactor A1 interposed in the conductor 58, which conductor additionally includes the relay winding 59 having associated relation with an electrovalve forming one of the elements of the welding machine. When relay winding A is energized contactor A1 closes and the winding 59 of the electrovalve is energized. Operation of the electrovalve effects a closing of the electrodes of the welding machine whereby they grip the workpieces to be welded.

The electrovalve also controls the application of a predetermined pressure to the workpieces to cause a closing of the contactor PS, located in the circuit provided by conductor 60. The circuit includes the "squeeze" timer so that the workpieces have a predetermined pressure applied thereto for a definite period of time as determined by said timer. Eventually relay winding B will be energized and contactors B1, B2, B3 and B4 are closed simultaneously. Closing of contactor B1 by-passes the foot switch so that the operator can now release his foot and the welding operation will be continued automatically. Closing of contactor B2 initiates the actuation of the "weld" timer such as 40, identified in Figures 1 and 11. The closing of contactors B3 and B4 has been described in connection with Figures 7 and 8. At the end of the weld period the relay winding C is energized, which causes closing of contactor C1 in circuit with the "hold" timer and the relay winding D. Actuation of the "hold" timer maintains the electrodes in closed position on the workpieces for a predetermined interval following termination of the weld period. Upon termination of the hold time the winding D will be energized and by energizing this winding the contactor D1 will be caused to open. The circuit to the relay winding A is accordingly opened so that the winding is de-energized and the effect is such as to cause opening of contactor A1 and actuation of the electrovalve to release the electrodes from the workpiece.

The above sequence of events takes place for each welding operation and it is immaterial whether the contactors are set for generating a positive or a negative pulse of uni-directional current in the secondary load circuit or for generating a pulse of sixty-cycle alternating current. The invention accordingly provides a combination welder which will be useful for many different welding operations. When used as a conventional A. C. spot welder it will have utility in all normal applications, requiring relatively low current with longer welding periods. As, for example, such a machine could deliver a maximum of 19,000 amperes with a weld time extending to perhaps two seconds, and based on a twenty-four inch throat depth and an eight inch gap between the arms a demand of approximately 116 kva. would be made on the power system. When the combination welder is converted to uni-directional welding pulses said machine will operate to deliver a welding pulse of 43,000 amperes maximum, with a weld time on the order of from five to approximately ten cycles of the alternating current source. In this latter case the demand on the power system would approximate only 93 kva. Thus, although the secondary current is 2.25 times higher than when delivering sixty-cycle secondary current, the demand from the power system is reduced to eight-tenths of that required to deliver the lower secondary current. In the welding of aluminum higher currents lasting approximately five cycles are required, whereas for welding steel longer periods with lower currents are required, such as are obtained with the conventional single phase sixty-cycle operation.

Figures 12 and 13 illustrate a preferred arrangement for the primary winding of the welding transformer disclosed in Figures 1 and 11. Although said Figures 1 and 11 illustrate the principle of the present invention, it is necessary to utilize for the A. C. welder less than the full number of turns in the primary winding for either half section thereof. If, for example, on a certain welder there were 144 turns for each half section of the primary winding, such a primary winding would produce a maximum current of approximately 43,000 amperes with the machine operating as an impulse welder. However, with the welder converted for use as an A. C. welder, it is required that use be made of only 72 turns of the primary winding in order to produce a secondary current of 19,000 amperes. The wiring arrangement for the primary winding is accordingly based on the foregoing since the complete winding for the primary is illustrated as composed of four primary coils identified by numerals 65, 66, 67 and 68. For illustrative purposes each primary coil may be considered as having seventy-two turns and all four coils are utilized in series, as shown in Figure 12, when the welder is connected for operation as an impulse welder. However, when operating as a conventional A. C. welder, and assuming that the contactors are so positioned as to energize the right half of the primary winding, it will be observed that a parallel connection of the two primary coils 67 and 68 are resorted to in order to provide a seventy-two to one turn ratio for the transformer. Thus, with the two coils connected in parallel by conductors 69 and 70 this entire right half of the primary winding is employed, although the turn ratio is maintained sufficiently low enough to induce the proper voltage and amperage in the secondary current. There are many conventional switching devices on the market for effecting a series-parallel switching operation and any of these may be employed to produce the necessary switching of coils 67 and 68 as above explained.

The impulse welder and single phase line frequency welder of the invention may be embodied in a system such as shown in Figure 14, wherein the contactors employed in the devices of Figures 1 and 11 are eliminated and current flow is controlled instead by four electric discharge valves disposed in pairs, with each pair being connected in back to back relation. The basic welding system of Figure 14 is disclosed and claimed in the Parsons et al. Patent No. 2,510,652, granted June 6, 1950. The welding transformer 80 consists of a primary winding including a left hand winding 81 and a right hand winding 82. A secondary winding 83 is wound on the same iron core so as to have inductive relation with the primary windings. The current supply for the welding transformer is the conventional single phase sixty-cycle alternating current as delivered by the first and second buses L1 and L2, respectively. The first bus is connected by conductor 85 to the primary winding, the said conductor providing a center tap for the winding, which divides the same into the left hand winding 81 and the right hand winding 82, as described. The second bus is connected by conductor 86 to the terminal of winding 81 and the second bus is also connected by conductor 87 to the terminal of winding 82. In each of the conductors 86 and 87 there is interposed a pair of asymmetrically conducting electric discharge valves in the form of "Ignitrons" having associated therewith "Thyratrons" for firing the valves, which structure will now be described in detail.

The first group of electric discharge valves, indicated by numerals 88 and 90, are interposed in conductor 86 and said valves are connected in back to back relation with the cathode of 88 being connected to the anode of 90, and with the anode of 88 being connected to the cathode of 90. The electric discharge valve 88 has associated therewith a firing valve 91 and in a similar manner firing valve 92 is associated with electric discharge valve 90. The grids and cathodes of the firing valves 91 and 92 are connected by conductors 93 and 94, with a weld timer generally indicated by numeral 95. The weld timer normally applies a biasing potential to the grids of the firing valves 91 and 92, thus holding the firing valves and the electric discharge valves in a non-conductive state. However, at the proper times the weld timer will render the grids of the firing valves positive with respect to their cathodes and thus the valves 91 and 92 are caused to fire to thereby render their respective discharge valves conductive. The second group of electric discharge valves is interposed in conductor 87, the same consisting of valves 96 and 97 connected in back to back relation, and each having associated therewith a firing valve such as 98 and 99, respectively. The conductors 100 and 101 connect the grids and cathodes of the firing valves to the weld timer which controls the firing of said valves and thus the conductivity of the electric discharge valves 96 and 97 in a manner as herein described.

For operation as an impulse welder the electric discharge valves 88 and 97 are rendered conductive, for which purpose the switch 102 is closed and the primary winding is center-tapped by the divider 103 provided by conductor 85. When the first bus is positive the current pulse is transmitted through conductor 85 and divider 103 to the left hand winding 81, the pulse returning by way of conductor 86 and valve 88 to the second bus. For the next pulse the second bus will be positive and current is delivered through switch 102, valve 97, conductor 87, to the right hand winding 82, the same returning by way of divider 103 and conductor 85. The first current pulse in flowing through winding 81 in a direction from right to left generates a magnetic flux in the transformer and which flux is increased in magnitude by the action of the next pulse of current in flowing through winding 82, also in a direction from right to left. The succeeding current pulses which flow through the windings in a manner as described have the effect of building up this magnetic flux so that a steady rise in the flux takes place, inducing an impulse of uni-directional current in the secondary winding 83. The electric discharge valves 88 and 97 in effect rectify the alternating current of the source and supply a uni-directional current to each primary winding and which have the same polarity since they flow in the same direction as regards both windings. When the electric discharge valves 88 and 97 are rendered non-conductive the welding operation is completed and the impulse of uni-directional current induced in the secondary, such as shown in Figure 5, performs the desired welding as herein described.

If it is assumed that electric discharge valves 88 and 97 produce a positive impulse of uni-directional current in the secondary, then a negative impulse can be induced for the next welding operation by rendering valves 90 and 96 conductive. The action is the same as above described except that current flow takes place in the windings 81 and 82 in a direction from left to right. The weld timer controls the conductivity of the electric discharge valves so that 88 and 97 are rendered conductive for one welding operation with 90 and 96 being rendered conductive for the following welding operation, and whereby said groups alternate to produce alternating positive and negative impulses in the secondary circuit for welding purposes. The weld timer may also include a phase shifting circuit whereby the firing point of the electric discharge valves, as regards their respective half cycles of current, may be varied to vary the magnitude of the current pulse and the heating effect of the secondary welding current.

For operating the combination welder of Figure 14 as a conventional sixty-cycle welder, switch 102 is opened, the same being located as shown in dotted lines in the figure. Also divider 103 is rotated to make connection at 104 with conductor 105. The effect of this connection is to reduce the number of turns in the primary winding 81, which, as explained, is necessary for operation of the system as an A. C. welder. Opening of switch 102 renders the discharge valves 96 and 97 inoperative so that the A. C. welder employs only valves 88 and 90, the same functioning as contactors to pass the sixty-cycle alternating current of the source through winding 81. Instead of using the divider 103 the primary winding of transformer 80 could embody the wiring arrangement of Figures 12 and 13, wherein four primary coils are employed, two being located on the respective sides of the center tap conductor. When the system is operated as an impulse welder the four primary coils are connected in series. However, for operation as a conventional A. C. welder the turn ratio is reduced by connecting the two coils on either half of the primary in parallel relation with each other.

The invention is not to be limited to nor by details of construction of the particular embodiment thereof illustrated by the drawings as various other forms of the device will of course be apparent to those skilled in the art without departing from the spirit of the invention or the scope of the claims.

What is claimed is:

1. In a combination welding system, a source of alternating current comprising a first and a second bus, a transformer including a primary winding on an iron core and having inductive relation with a secondary load circuit, a conductor center tapping the primary winding and connecting the same to the first bus, a pair of asymmetrically conducting electric discharge valves connected inversely to the second bus, whereby one electric discharge valve when conductive will pass the positive half cycles of the alternating current and the other electric discharge valve when conductive will pass the negative half cycles, and connections between the electric discharge valves and the terminals of the primary winding, said connections having a plurality of positions to cause the current to flow through the primary winding in a different manner for each position, whereby either positive or negative pulses of uni-directional current are induced in the secondary load circuit or an alternating current is induced in said secondary load circuit having the same frequency as the source.

2. In a combination welding system, a source of alternating current comprising a first and a second bus, a transformer including a primary winding on an iron core and having inductive relation with a secondary load circuit, a center tap conductor connecting the primary winding to the first bus whereby said winding consists of two sections on respective sides of the center tap with each section providing a terminal, a pair of asymmetrically conducting electric discharge valves connected inversely to the second bus, whereby one electric discharge valve when conductive will pass the positive half cycles of the alternating current and the other electric discharge valve when conductive will pass the negative half cycles, and connections between the electric discharge valves and the terminals of primary winding, said connections having a plurality of positions to cause the current to flow through the primary winding in a different manner for each position, whereby in one position positive pulses of uni-directional current will be induced in the secondary load circuit, in another position negative pulses of uni-directional current will be induced, and in certain other positions an alternating current will be induced in said secondary load circuit having the same frequency as the source.

3. A combination welding system as defined in claim 2, additionally including a timer for controlling the conductivity of the electric discharge valves to time the duration of current flow through the primary winding for all positions of the connections.

4. In a combination welding system, a source of alternating current comprising a first bus and a second bus, a transformer including a primary winding on an iron core and having inductive relation with a secondary load circuit, a center tap conductor connecting the primary winding to the first bus whereby said winding consists of two sections on respective sides of the center tap with each section providing a terminal, a pair of asymmetrically conducting electric discharge valves connected inversely to the second bus, whereby one electric discharge valve when conductive will pass the positive half cycles of the alternating current and the other electric discharge valve when conductive will pass the negative half cycles, and switching elements for each section of the primary winding providing connections between its respective electric discharge valve and the terminals of the primary winding, said switching elements having a plurality of positions to cause the current to flow through the primary winding in a different manner for each position, whereby for certain positions either a positive or a negative pulse of uni-directional current will be induced in the secondary load circuit, and for other positions an alternating current will be induced in said secondary load circuit having the same frequency as the source.

5. A combination welding system as defined in claim 2, additionally including a timer for controlling the conductivity of the electric discharge valves to time the duration of current flow through the primary winding for all positions of the connections.

6. In a combination welding system, a source of alternating current comprising a first bus and a second bus, a load circuit comprising a primary winding having a first, second and third terminal, a conductor connecting the second terminal to the first bus, a first electric discharge valve including an anode, a cathode and an igniter, a conductor connecting the anode of the first valve to the second bus, a second electric discharge valve, including an anode, a cathode and an igniter, a conductor connecting the cathode of the second valve to the second bus, switching means for the first electric discharge valve for connecting the cathode of the valve to either the first or third terminal of the load circuit, other switching means for the second electric discharge valve for connecting the anode of the valve to either the first or third terminal of the load circuit, and a timer in electrical connection with the igniters of the electric discharge valves for controlling the conductivity of the valves.

7. In a combination welding system, a source of alternating current comprising a first bus and a second bus, a load circuit comprising a primary winding having a first, second and third terminal, a conductor connecting the second terminal to the first bus, a first and a second electric discharge valve each including an anode, a cathode and an igniter, said valves being connected to the second bus in inverse relation so that one valve when conductive will pass the positive half cycles of the alternating current and the other valve when conductive will pass the negative half cycles, first switching means for the first electric discharge valve for connecting the valve to either the first or third terminal of the load circuit, and second switching means for the second electric discharge valve for connecting said second valve to either the first or third terminal of said load circuit.

8. A combination welding system as defined by claim 7, additionally including means responsive to current flow in the load circuit for actuating both said switching means, whereby to switch the connection of the first valve from the first to the third terminal and to switch the connection of the second valve from the third to the first terminal and vice versa, and timing means in electrical connection with the igniters of the electric discharge valves for controlling the conductivity of the valves.

9. In a combination welding system, a source of alternating current comprising a first bus and a second bus, a welding transformer providing a primary winding, said primary winding having a center tap connected to the first bus and which divides the winding into two sections each having a terminal, means connecting the terminals to the second bus including a first and second electric discharge valve, said valves each having an anode, a cathode and an igniter and said valves being inversely connected to the second bus so that one valve when conductive will pass the positive half cycles of the alternating current and the other valve when conductive will pass the negative half cycles, and contactors connecting the valves with said terminals and having a plurality of positions to cause the current to flow through the primary winding in a different manner for each position.

10. In a combination welding system, a source of alternating current comprising a first bus and a second bus, a welding transformer providing a primary winding, said primary winding having a center tap connected to the first bus and which divides the winding into two sections each having a terminal, means connecting the terminals to the second bus including a first and second electric discharge valve, said valves each having an anode, a cathode and an igniter and said valves being inversely connected to the second bus so that one valve when conductive will pass the positive half cycles of the alternating current and the other valve when conductive will pass the negative half cycles, a contactor for connecting the first electric discharge valve to either terminal, and a second contactor for connecting the second electric discharge valve to either terminal, each contactor there having two different positions and for the plurality of possible positions for said contactors the current will flow through the primary winding in a different manner for each such position.

11. In a combination welding system, a source of alternating current comprising a first bus and a second bus, a welding transformer providing a primary winding and a secondary load circuit, said primary winding having a center tap terminal and a first and second end terminal, a conductor connecting the center tap terminal to the first bus, first and second electric discharge valves in associated relation with the first and second terminals respectively, each electric discharge valve including an anode, a cathode and an igniter, said valves being inversely connected to the second bus so that one valve when conductive will pass the positive half cycles of the alternating current and the other valve when conductive will pass the negative half cycles, a first contactor for connecting the first electric discharge valve to either the first or second terminal, a second contactor for connecting the second electric discharge valve to either the first or second terminal, whereby current flows through the primary winding in a different manner for the several different positions of the contactors, and a timer in electrical connection with the igniters of the electric discharge valves for controlling the conductivity of the valves.

12. In a combination welding system, a source of alternating current comprising a first bus and a second bus, a transformer including a primary winding on an iron core and having inductive relation with a secondary load circuit, a center tap conductor connecting the primary winding to the first bus whereby said winding consists of two sections on respective sides of the center tap with each section providing a terminal, a pair of asymmetrically conducting electric discharge valves connected inversely to the second bus, whereby one electric discharge valve when conductive will pass the positive half cycles of the alternating current and the other electric discharge valve when conductive will pass the negative half cycles, switching elements for each section of the primary winding providing connections between its respective electric discharge valve and the terminals of the primary winding, said switching elements having a plurality of positions to cause the current to flow through the primary winding in a different manner for each position, whereby for certain positions either a positive or a negative pulse of unidirectional current will be induced in the secondary load circuit, and for other positions an alternating current will be induced in said secondary load circuit having the same frequency as the source, said primary winding consisting of a pair of coils in each half section with said coils having the same number of turns, all the coils of said primary winding being connected in series circuit relation when the switching elements are positioned to produce either a negative or positive pulse of uni-directional current, and the coils of a certain half section being connected in parallel circuit arrangement when the switching elements are positioned to produce an alternating current of the same frequency as the source.

13. In a combination welding system, a source of alternating current comprising a first bus and a second bus, a load circuit comprising a primary winding having a first, second and third terminals, a conductor connecting the first bus to the second terminal and providing a center tap connection which divides the primary winding into respective half sections, a first electric discharge valve including an anode, a cathode and an igniter, a conductor connecting the anode of the first valve to the second bus, a second electric discharge valve including an anode, a cathode and an igniter, a conductor connecting the cathode of the second valve to the second bus, switching means for the first electric discharge valve for connecting the cathode of the valve to the first or third terminal of the load circuit, other switching means for the second electric discharge valve for connecting the anode of the valve to either the first or third terminal of the load circuit, a timer in electrical connection with the igniters of the electric discharge valves for controlling the conductivity of the valves, said primary winding consisting of a pair of coils in each half section with the coils having the same number of turns, all the coils of said primary winding being connected in series circuit relation when the switching means are located in certain positions, and the coils of a particular half section being connected in parallel circuit arrangement when the switching means are located in certain other positions.

14. In a combination welding system, a source of alternating current comprising a first bus and a second bus, a welding transformer providing a primary winding, said primary winding having a center tap connected to the first bus and which divides the winding into two sections each having an end terminal, means connecting the end terminals to the second bus including a first and a second electric discharge valve, said valves each having an anode, a cathode and an igniter and said valves being inversely connected to the second bus so that one valve when conductive will pass the positive half cycles of the alternating current and the other valve when conductive will pass the negative half cycles, switching elements connecting the valves with the end terminals and having a plurality of positions to cause the current to flow through the primary winding in a different manner for each position, said primary winding consisting of a plurality of coils in each section with said coils having approximately the same number of turns, all the coils of said primary winding being connected in series circuit relation when the switching elements are located in certain positions, and the coils of a particular half section being connected in parallel circuit arrangement when the switching elements are located in certain other positions.

References Cited in the file of this patent

UNITED STATES PATENTS 2,430,213    Da Rosa et al. ------------ Nov. 4, 1947
2,508,708    Dawson ---------------- May 23, 1950